(12) United States Patent
Booth et al.

(10) Patent No.: US 9,598,594 B2
(45) Date of Patent: *Mar. 21, 2017

(54) TITANIUM DIOXIDE PIGMENT GRIND DISPERSION AND PAINT

(71) Applicant: Valspar Sourcing, Inc., Minneapolis, MN (US)

(72) Inventors: Karl A. Booth, Minneapolis, MN (US); Stephen M. Korenkiewicz, Minneapolis, MN (US); Laura E. Harris, Minneapolis, MN (US); Alexis R. Kipping, Minneapolis, MN (US); Jeffrey F. Taylor, Cincinnati, OH (US)

(73) Assignee: Valspar Sourcing, Inc., Minneapolis, MN (US)

(*) Notice: Subject to any disclaimer, the term of this patent is extended or adjusted under 35 U.S.C. 154(b) by 2 days.

This patent is subject to a terminal disclaimer.

(21) Appl. No.: 15/042,850

(22) Filed: Feb. 12, 2016

(65) Prior Publication Data

US 2016/0168409 A1 Jun. 16, 2016

Related U.S. Application Data

(63) Continuation of application No. 14/391,322, filed as application No. PCT/US2013/037574 on Apr. 22, 2013, now Pat. No. 9,284,467.

(60) Provisional application No. 61/789,784, filed on Mar. 15, 2013, provisional application No. 61/636,552, filed on Apr. 20, 2012.

(51) Int. Cl.
| | |
|---|---|
| *C09D 17/00* | (2006.01) |
| *C09C 1/36* | (2006.01) |
| *B82Y 30/00* | (2011.01) |
| *C09D 7/12* | (2006.01) |

(52) U.S. Cl.
CPC ............ *C09D 17/008* (2013.01); *B82Y 30/00* (2013.01); *C09C 1/36* (2013.01); *C09C 1/3676* (2013.01); *C09D 7/1225* (2013.01); *C01P 2004/62* (2013.01); *C01P 2004/64* (2013.01); *C01P 2006/22* (2013.01); *C01P 2006/62* (2013.01)

(58) Field of Classification Search
CPC .......................... C09D 17/008; C09D 7/1225
See application file for complete search history.

(56) References Cited

U.S. PATENT DOCUMENTS

| | | | |
|---|---|---|---|
| 3,453,130 A | 7/1969 | Feld | |
| 4,227,935 A | 10/1980 | Blake et al. | |
| 4,474,909 A | 10/1984 | Smith et al. | |
| 4,474,911 A | 10/1984 | Smith et al. | |
| 4,885,320 A | 12/1989 | Biale | |
| 5,011,862 A | 4/1991 | Melber et al. | |
| 5,135,568 A | 8/1992 | Fasano | |
| 5,171,631 A | 12/1992 | Adkins | |
| 5,201,948 A | 4/1993 | Fasano et al. | |
| 5,385,960 A | 1/1995 | Emmons et al. | |
| 5,509,960 A | 4/1996 | Simpson et al. | |
| 5,534,585 A | 7/1996 | Roulstone et al. | |
| 5,663,213 A | 9/1997 | Jones et al. | |
| 5,672,201 A | 9/1997 | Simpson et al. | |
| 5,869,559 A | 2/1999 | Simpson et al. | |
| 5,886,069 A | 3/1999 | Bolt | |
| 6,080,802 A | 6/2000 | Emmons et al. | |
| 6,214,467 B1 | 4/2001 | Edwards et al. | |
| 6,576,051 B2 | 6/2003 | Bardman et al. | |
| 6,646,058 B1 | 11/2003 | Koger | |
| 6,762,230 B2 | 7/2004 | Owens et al. | |
| 6,881,782 B2 | 4/2005 | Crater et al. | |
| 6,890,983 B2 | 5/2005 | Rosano et al. | |
| 7,081,488 B2 | 7/2006 | Bardman et al. | |
| 7,179,531 B2 | 2/2007 | Brown et al. | |
| 7,265,166 B2 | 9/2007 | Gebhard et al. | |
| 7,482,054 B2 | 1/2009 | Tarng et al. | |
| 7,642,309 B2 | 1/2010 | Tarng et al. | |

(Continued)

FOREIGN PATENT DOCUMENTS

| | | |
|---|---|---|
| EP | 0 549 163 A1 | 6/1993 |
| EP | 0 700 976 A2 | 3/1996 |

(Continued)

OTHER PUBLICATIONS

Koleske et al., *Two Thousand Three Additives Guide*, Paint and Coatings Industry, pp. 12-86, (Apr. 2003).
Procopio, Leo J. et al., Low-VOC Waterborne Coatings for Use in Industrial Maintenance Painting, JCT Coatings Tech, Cover page, pp. 51-59 (Feb. 2007).
Critical Composite Ratio: Kronos 4311, Data Sheet, DOW® Coating Materials, 1 page (2012).
Evoque™ Pre-Composite Polymer Technology, Technical Data Sheet, DOW® Chemical Company, pp. 1-8 (Mar. 2011).
Evoque™ Pre-Composite Polymer Technology, Handling Dry and Slurry TiO₂ Guidelines, DOW® Chemical Company, 7 pages (2011).

(Continued)

*Primary Examiner* — Robert Harlan
(74) *Attorney, Agent, or Firm* — Patterson Thuente Pedersen, P.A.

(57) ABSTRACT

A pigment grind dispersion contains non-adsorbed titanium dioxide particles dispersed in an aqueous emulsion containing a mixture of (a) water-insoluble film-forming first polymer particles that adsorb to titanium dioxide particles, the first polymer particle amount in the emulsion being less than the saturation level of adsorption when another polymer is not present, (b) water-insoluble film-forming second polymer particles that do not by themselves form composite particles with titanium dioxide particles, the second polymer particle amount in the emulsion being sufficient to inhibit or interfere with adsorption of the first polymer particles to titanium dioxide particles, and (c) extender particles. The pigment grind dispersion has a titanium dioxide pigment volume concentration of about 25 to about 50 and a titania composite ratio of about 32 to about 60.

20 Claims, 2 Drawing Sheets

(56) References Cited

U.S. PATENT DOCUMENTS

| | | | |
|---|---|---|---|
| 7,727,323 B2 | 6/2010 | Tarng et al. |
| 7,772,318 B2 | 8/2010 | Fasano et al. |
| 7,812,079 B2 | 10/2010 | Brandenburger et al. |
| 7,947,763 B2 | 5/2011 | Tarng et al. |
| 8,106,239 B2 | 1/2012 | Zhou et al. |
| 8,110,624 B2 | 2/2012 | Brandenburger et al. |
| 8,141,599 B2 | 3/2012 | Korenkiewicz et al. |
| 8,293,361 B2 | 10/2012 | Killilea et al. |
| 8,318,848 B2 | 11/2012 | Finegan et al. |
| 8,394,496 B2 | 3/2013 | Foster et al. |
| 9,284,467 B2 * | 3/2016 | Booth .................. C09C 1/36 |
| 2001/0050030 A1 | 12/2001 | Friel et al. |
| 2004/0054063 A1 | 3/2004 | Brown et al. |
| 2006/0223911 A1 | 10/2006 | Bardman et al. |
| 2007/0135567 A1 | 6/2007 | Ruhoff et al. |
| 2009/0149591 A1 | 6/2009 | Yang et al. |
| 2009/0162558 A1 | 6/2009 | Bardman et al. |
| 2009/0207476 A1 | 8/2009 | Yanagisawa et al. |
| 2010/0056668 A1 * | 3/2010 | Brown .................. C08F 275/00 523/200 |
| 2010/0166967 A1 | 7/2010 | Fasano |
| 2010/0324186 A1 | 12/2010 | Birmingham et al. |
| 2011/0290152 A1 | 12/2011 | Gebhard et al. |
| 2012/0004359 A1 | 1/2012 | Cavallin et al. |
| 2012/0058278 A1 | 3/2012 | Bohling et al. |
| 2012/0302700 A1 | 11/2012 | Tao et al. |
| 2013/0085222 A1 | 4/2013 | Fasano et al. |

FOREIGN PATENT DOCUMENTS

| | | |
|---|---|---|
| EP | 0 955 345 A1 | 11/1999 |
| EP | 1 496 091 A1 | 1/2005 |
| EP | 1 591 490 A2 | 11/2005 |
| EP | 2 161 304 A1 | 3/2010 |
| JP | 60-001268 | 1/1985 |
| JP | 11-049993 | 2/1999 |
| WO | WO 93/11181 | 6/1993 |
| WO | WO 01/60925 A2 | 8/2001 |
| WO | WO 2008/143153 A1 | 11/2008 |
| WO | WO 2011/094425 A2 | 8/2011 |
| WO | WO 2011/112171 | 9/2011 |

OTHER PUBLICATIONS

FASTRACK™ 2706 Polymer Emulsion for Waterborne Traffic Marking Paints, Information Sheets, Rohm and Haas Company, 14 pages (Nov. 1999).

Braun, Juergen H., Introduction to Pigments, Federation Series on Coatings Tech., DuPont Chemicals, R & D Division, Wilminton, DE, 33 pages (Jan. 1993).

FASTRACK™ HE-2706, Preliminary Technical Information, DOW® Coating Materials, 1 page (2011).

Kronos pigments for coatings, Information Sheets, pp. 10-13 (2011).

Non-HAPS Solvents Commonly Used in Coatings, Technical Information Sheet, 1 page (2006).

RHOPLEX™ VSR-1050 100% Acrylic Emulsion, Material Safety Data Sheets, Rohm & Hass Company, 9 pages (Mar. 2007).

RHOPLEX™ VSR-2015 100% Acrylic Low-Solvent Capable Binder for Interior/Exterior Flat to Semi-Gloss Coatings, Material Safely Data Sheets, Rohm & Haas Company, 11 pages (Nov. 2008).

Rosano, William J. et al., Optimal dispersion, Avanse™ Resin Technology, 10 pages (2007).

Wildeson J. et al., Understanding and Improvement of $TiO_2$ Efficiency in Waterborne Paints Through Latex Design, Technology Today, JCT Coatings Tech, 8 pages (Jul. 2008).

Gong, Xiaobo, Cryo-SEM Study of Nanostructure Development of Latex Dispersions and Block Copolymer Solutions, A Dissertation Submitted to the Faculty of the Graduate School of the University of Minnesota, 252 pages (Nov. 2008).

* cited by examiner

TITANIUM DIOXIDE PIGMENT GRIND DISPERSION AND PAINT

CROSS REFERENCE TO RELATED APPLICATION

This application is a continuation of U.S. application Ser. No. 14/391,322 filed Oct. 8, 2014, which is in turn a national stage filing under 35 U.S.C. §371 of International Application No. PCT/US2013/037574 filed Apr. 22, 2013, which claims priority under 35 U.S.C. §119 to U.S. Provisional Application Nos. 61/789,784 filed Mar. 15, 2013 and 61/636,552 filed Apr. 20, 2012, the disclosures of all of which are incorporated herein by reference.

FIELD

This invention relates to pigmented paints and other coating compositions.

BACKGROUND

Titanium dioxide is a widely-used but increasingly expensive pigment in paints and other coating compositions. In many paint formulations titanium dioxide represents the single most expensive raw material. A number of techniques and ingredients have been suggested for reducing the amount of titanium dioxide in coating composition formulations while still providing acceptable light scattering or opacity. One such ingredient is EVOQUE™ Pre-Composite Polymer supplied by Dow Chemical Company. EVOQUE products are presently available in four grades (EVOQUE 1140, EVOQUE 1180, EXP-4340 and EXP-4463) that are said to have differing degrees of reactivity towards titanium dioxide. According to its supplier, EVOQUE pre-composite polymer "combines with $TiO_2$ to form a polymer-pigment composite which improves both the wet and dry hiding efficiency of the pigment."

Also according to its supplier, "A minimum level of EVOQUE Pre-Composite Polymer is required to fully cover the surface of $TiO_2$ in order to improve hiding efficiency and allow for developing stable formulations." The recited minimum level is sometimes called the "saturation level" or "saturation level of adsorption" (defined below). The saturation level will depend on the pigment volume concentration (PVC, defined below), with lesser polymer addition levels being needed to reach the saturation level of adsorption at low PVC and greater polymer addition levels being needed to reach the saturation level of adsorption at high PVC.

Some patents describing composite pigment particle-forming polymers that are believed to be like the polymer present in EVOQUE Pre-Composite Polymer say that other copolymers may be present during formation of the composite particle, so long as such other copolymers do not inhibit or substantially interfere with adsorption of the polymer particle to the pigment particle.

The currently recommended method for making latex paints using EVOQUE Pre-Composite Polymer is carried out by dispersing titanium dioxide into a mixture of EVOQUE Pre-Composite Polymer, water and defoamer to form a composite, and then combining the composite with the remaining paint ingredients including an acrylic latex paint binder in order to form a finished paint formulation. In this method, the acrylic latex paint binder is not combined with the composite until after the composite has been formed. The resulting paint or other coating composition may attain a given degree of pigment hiding at a somewhat reduced titanium dioxide pigment level, or may attain a somewhat increased degree of pigment hiding at a given titanium dioxide pigment level. However, the potential savings in titanium dioxide raw material costs and the potential benefits in pigment hiding efficiency are offset by the EVOQUE product cost.

From the foregoing, it will be appreciated that what remains needed in the art are improved titanium dioxide-containing coating compositions having even lower raw material cost, even greater pigment hiding efficiency, or both lower cost and greater efficiency. Such compositions and components and methods for their manufacture are disclosed and claimed herein.

SUMMARY OF THE INVENTION

We have found that paints and other coating compositions having excellent opacity and hiding power at low usage levels of both titanium dioxide and composite pigment particle-forming polymer may be obtained by disregarding the above-mentioned supplier's requirements and instructions. Without intending to be bound by theory, we believe that titanium dioxide may be more efficiently used in a coating composition containing a composite pigment particle-forming polymer if during composite formation, a waterborne emulsion polymer that does not form such a composite is present in an amount sufficient to inhibit (for example, slow down) or otherwise interfere with adsorption of the composite-forming polymer particles to the titanium dioxide particles. This can if desired also enable use of less than a saturation level of the composite-forming polymer while still providing composite particles that efficiently employ titanium dioxide. By using a latex paint binder or other low-cost waterborne emulsion polymer as the interfering polymer, an overall cost reduction can be achieved together with equivalent or even improved hiding and other paint properties.

The present invention provides, in one aspect, a method for making a pigment grind dispersion of titanium dioxide pigment-polymer composite particles, which method comprises:
  (a) mixing titanium dioxide particles with an aqueous emulsion containing:
    (i) water-insoluble film-forming first polymer particles that adsorb to the titanium dioxide particles, the first polymer particle amount in the emulsion being less than the saturation level of adsorption when another polymer is not present, and
    (ii) water-insoluble film-forming second polymer particles that do not by themselves form composite particles with the titanium dioxide particles, the second polymer particle amount in the emulsion being sufficient to inhibit or interfere with adsorption of the first polymer particles to the titanium dioxide particles;
  wherein the pigment grind dispersion has a titanium dioxide pigment volume concentration of about 25 to about 50 and a titania composite ratio (TCR, defined below) of about 32 to about 60; and
  (b) forming titanium dioxide pigment-polymer composite particles that provide improved coating composition opacity compared to a coating composition that does not contain such first polymer particles.

The present invention provides, in another aspect, a pigment grind dispersion comprising non-adsorbed titanium dioxide particles dispersed in a circulating aqueous emulsion containing a mixture of:

(a) water-insoluble film-forming first polymer particles that adsorb to the titanium dioxide particles, the first polymer particle amount in the emulsion being less than the saturation level of adsorption when another polymer is not present, and (b) water-insoluble film-forming second polymer particles that do not by themselves form composite particles with the titanium dioxide particles, the second polymer particle amount in the emulsion being sufficient to inhibit or interfere with adsorption by the first polymer particles to the titanium dioxide particles, wherein the pigment grind dispersion has a titanium dioxide pigment volume concentration of about 25 to about 50 and a titania composite ratio of about 32 to about 60.

The present invention provides, in yet another aspect, a pigment grind dispersion consisting essentially of an aqueous emulsion containing:

(a) titanium dioxide pigment-polymer composite particles having water-insoluble film-forming first polymer particles adsorbed to the titanium dioxide particles, the first polymer particle amount in the emulsion being less than the saturation level of adsorption when another polymer is not present, and the composite particles providing improved coating composition opacity compared to a coating composition that does not contain such first polymer particles, (b) water-insoluble film-forming second polymer particles that do not by themselves form composite particles with the titanium dioxide particles, the second polymer particle amount in the emulsion being sufficient to inhibit or interfere with such adsorption by the first polymer particles to the titanium dioxide particles, the pigment grind dispersion having a titanium dioxide pigment volume concentration of about 25 to about 50 and a titania composite ratio of about 32 to about 60, and (c) optionally one or more extender particles, dispersing agents or defoamers.

The present invention provides, in a further aspect, a coating composition containing (i) the above-described pigment grind dispersion, (ii) one or more opacifiers, rheology modifiers, coalescents, wetting agents or waxes, and (iii) optional additional water-insoluble film-forming emulsion polymer particles that do not adsorb to the titanium dioxide particles.

The disclosed methods, pigment grind dispersions and coating compositions can provide dried coatings having excellent opacity and hiding power at reduced titanium dioxide or composite-forming polymer usage levels. The methods and pigment grind dispersions appear to have particular value for making semigloss, gloss, high hiding or super hiding paints and other coating compositions.

BRIEF DESCRIPTION OF THE DRAWING

Like reference symbols in the various figures of the drawing indicate like elements. The elements in the drawing are not to scale.

DETAILED DESCRIPTION

Figure 1:
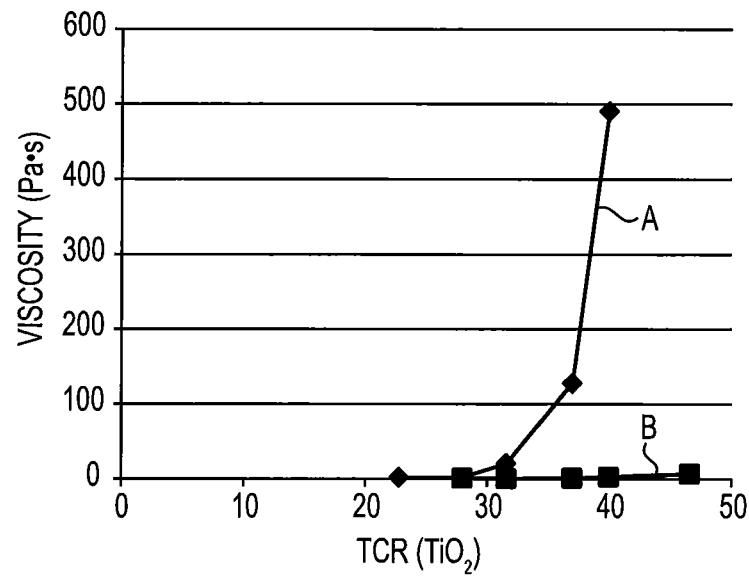
FIG. 1 is a graph showing viscosity for a series of composite particle-containing pigment grind dispersions prepared according to the manufacturer's recommendation or prepared according to the present invention, and measured one hour after composite formation.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The terms "adsorb" and "adsorption" when used with respect to titanium dioxide particles and polymer particles in a fluid medium means that the titanium dioxide and polymer particles when allowed to equilibrate in the fluid medium and observed using electron microscopy appear to have formed stable composite particles in which a sufficient number of titanium dioxide particles contact a sufficient number of polymer particles so as to provide an improvement in titanium dioxide particle spacing and contrast ratio in a dried coating composition containing such composite particles. If observed using scanning electron microscopy, the fluid medium may be evaporated away and the sample subjected to conventional plating and polishing steps prior to observation. If observed using transmission electron microscopy, the fluid medium may be drawn down to a thin film and frozen prior to observation. The observed adsorption may arise due to physisorption, chemisorption, electrostatic attraction or by other means.

The term "architectural paint" means a coating composition for use on interior or exterior building components, and includes both paints and stains.

The term "binder" means a film-forming natural or synthetic polymer suitable for use in paints and other coating composition.

The term "circulating" when used with respect to a composition means that the composition is a fluid that may or may not contain dispersed solid particles and which is undergoing stirring, agitation or other shear forces sufficient to mix components in the composition.

The term "contrast ratio" means a value determined by casting a 51 μm (2 mil) dry thickness coating film over the white and black portions of a Leneta Co. Form 3B opacity drawdown chart (from BYK-Gardner USA), measuring L* as defined in the ASTM International Standards on Color and Appearance Measurement: 8th Edition, and dividing the L* value measured over the black portion by the L* value measured over the white portion.

The terms "titania composite ratio" or "TCR" when used with respect to a pigment grind dispersion, paint or other coating composition mean the total percentage of the dried solids volume, excluding extender pigments and opaque polymers, occupied by titanium dioxide particles in such dried solids.

The term "film-forming" when used in reference to a water-insoluble particulate polymer means that an aqueous dispersion of the polymer particles can be formed, coated in a thin wet layer (e.g., of about 25 μm thickness) on a suitable support, and dried or otherwise hardened (optionally with the aid of a suitable coalescent) to form a substantially continuous coating over the support.

The term "fluid" when used in reference to a substance means that the substance is a liquid that may or may not contain dispersed solid particles and which has a loss modulus (G") greater than its storage modulus (G') and a loss tangent (tan δ) greater than 1.

The term "low VOC" when used with respect to paints and other coating composition means that the coating composition contains less than about 5 wt. percent volatile organic compounds, preferably less than about 3 wt. % volatile organic compounds, more preferably less than about 1 wt. % volatile organic compounds and most preferably less than about 0.5 wt. % volatile organic compounds based upon the total coating composition weight.

The term "opaque" when used with respect to paints and other coating composition means that a dry film of the coating composition has a contrast ratio greater than 95% at a 51 μm (2 mil) dry film thickness.

The term "paint" means a coating composition including pigment and a film-forming binder which when applied to form a thin (e.g., 100 μm) wet thickness coating film on a freshly-sanded smooth wood surface, will dry to form a continuous film over the surface, and includes non-penetrating or other stains that will dry to form such a continuous film.

The term "pigment" means an inorganic particulate material having light-reflective characteristics and a surface energy and particle size suitable for use in paints and other coating compositions.

The terms "pigment volume concentration" or "PVC" when used with respect to a pigment grind dispersion, paint or other coating composition mean the total percentage of dried solids volume, including extender pigments and opaque polymers, occupied by a recited pigment species (or if no pigment species is recited, then by all pigment species) in such dried solids.

The terms "polymer" and "polymeric" include polymers as well as copolymers of two or more monomers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "primer" refers to a coating composition that is applied in one or more layers to a bare substrate and which if left uncoated without a topcoat would not be capable of withstanding extended outdoor exposure (e.g., exposure equivalent to one year of vertical south-facing Florida sunlight) without visually objectionable deterioration.

The terms "saturation level" and "saturation level of adsorption" when used with respect to titanium dioxide particles and polymer particles that adsorb to the titanium dioxide particles in a fluid medium mean a polymer addition level at which the amount of polymer adsorbed per unit of titanium dioxide particles plateaus.

The term "solvent-borne" when used with respect to paints or other coating compositions means that the major liquid vehicle or carrier for such coating composition is a nonaqueous solvent or mixture of nonaqueous solvents.

When used with respect to a component which may be found in a paint or other coating composition, the term "substantially free of" means containing less than about 1 weight percent of the component based on the coating composition weight.

The term "topcoat" refers to a coating composition which when dried or otherwise hardened provides a decorative or protective outermost finish layer on a coated substrate. By way of further explanation, such topcoats may be applied in one or more layers and may be applied to bare or primer-coated substrates.

The term "water-borne" when used with respect to paints and other coating compositions means that the major liquid vehicle or carrier for such coating composition is water.

The term "water-insoluble" when used with respect to a polymer means that particles of the polymer may be mixed (optionally with the aid of a suitable dispersant) into water to form a particulate polymer dispersion.

The disclosed titanium dioxide particles provide light scattering sites within a dried film of the disclosed coating compositions, and impart hiding or opacity to the dried film. Representative titanium dioxide particles can have a variety of forms, including rutile, anatase and Brookite titanium dioxide. Blends, for example of rutile and anatase titanium dioxide, may also be employed, as well as blends of titanium dioxide together with pigments other than titanium dioxide. Representative lists of such other pigments may be found in U.S. Pat. No. 5,509,960 (Simpson et al.) and U.S. Pat. No. 7,179,531 B2 (Brown et al.), and in Published U.S. Patent Application No. US 2011/0290152 A1 (Gebhard et al. '152). The titanium dioxide particles may have a variety of shapes and sizes but desirably will scatter photons having wavelengths in the spectral region from 300 nm to 750 nm and especially in the visible spectral region from 380 nm to 700 nm. Suitable shapes for the titanium dioxide particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. Particles having spherical shapes desirably have average diameters of about 10 nm to about 1,000 nm, e.g., about 100 nm to about 500 nm, about 200 nm to about 300 nm, or about 230 nm. Particles having non-spherical shapes desirably have a maximum diameter of up to about 1 micrometer, e.g., up to about 500 nm or up to about 300 nm. The titanium dioxide particles may include one or more coatings, e.g., of silica, alumina, zirconia or combinations thereof such as a silica coating and an alumina coating. Exemplary commercially available titanium dioxide particles include those made by the chloride process and those made by the sulfide process, and those made in slurry or dry forms, e.g., KRONOS™ 1071, 2020, 2044, 2090, 2101, 2102, 2131, 2160, 2210, 2310, 4102, 4310 and 4311 from Kronos, Inc., TIONA™ 595 and 596i from Millennium Specialty Chemicals Inc. TIPURE™ TS-6200, R-706, R-741, R-746, R-900, R-902+, R-931 and R-960 from E. I. duPont de Nemours and Company, TRONOX™ CR-813, CR-813S, CR-826, CR-826S, CR-828, CR-834 and CR-880 from Tronox Corporation, and products from other suppliers including Bluestar New Chemical Materials Co., Ltd., Hebei Chuanghui Chemicals Co., Ltd., Henan Billions Chemicals Co., Ltd., Ishihara Sangyo Kaisha, Ltd., Nanjing Hengsiman Chemical Co., Ltd., Pangang Titanium Industry Co., Ltd., Qingdao Gracecorp Co., Ltd., Sakai Chemical Industry Co., Ltd., Shanghai Yuejiang Titanium Chemical Manufacturer Co., Ltd., Shijiazhuang Kelichuangxin Chemicals Co., Ltd. and Xuzhou Zhonglian Chemical Technology Co., Ltd. and mixtures thereof.

A variety of water-insoluble film-forming first polymer particles (the "first polymer") that adsorb to titanium dioxide particles may be employed in the disclosed pigment grind dispersions and the disclosed coating compositions. Exemplary first polymers are described in the above-mentioned Simpson et al. and Brown et al. patents as well as in U.S. Pat. No. 5,385,960 (Emmons et al. '960), U.S. Pat. No. 6,080,802 (Emmons et al. '802), U.S. Pat. No. 6,576,051 B2 (Bardman et al. '051), U.S. Pat. No. 6,881,782 B2 (Crater et al.), U.S. Pat. No. 7,081,488 B2 (Bardman et al. '488), U.S. Pat. No. 7,265,166 B2 (Gebhard et al. '166) and U.S. Pat. No. 8,318,848 B2 (Finegan et al.), in European Patent Application No. EP 0 700 976 A2 (Tioxide Group Services Limited) and in International Application No. WO 93/11181 (Emmons et al. '181). The first polymers typically are waterborne addition polymers formed by the aqueous emulsion polymerization of at least one ethylenically unsaturated monomer containing a pendant group capable of facilitating adsorption of the first polymer particles to titanium dioxide particles, and optionally one or more other ethylenically unsaturated monomers. Exemplary such pendant groups include phosphorus groups (e.g., dihydrogen phosphate groups), acetoacetoxy groups, 1,3-dicarbonyl groups, aldehyde groups, acid groups, amine groups, epoxy groups, isocyanate groups, thiorane groups, isothiocyanate groups, alcohol groups, carbodiimides groups, aziridine groups, haloalkane groups, and halophenyl groups. In place of or in addition to the at least one ethylenically unsaturated monomer containing such a pendant group, the first polymer may be formed from a reaction mixture containing one or more ethylenically unsaturated monomers containing a select pendant group capable of reacting with a coupling agent that will provide a group capable of adsorbing the first polymer particle to a titanium dioxide particle, followed by reaction of the resulting first polymer particles with such a coupling agent. Exemplary select pendant groups and coupling agents are described in, e.g., the above-mentioned Bardman et al. '488 and Brown et al. patents. The first polymer particles may be single stage or multistage polymers. Exemplary multistage polymers are described in, e.g., the above-mentioned Emmons et al. '960, Emmons et al. '802, Bardman et al. '051, Bardman et al. '488, Brown et al. and Finegan et al. patents. The glass transition temperature (Tg) of the first polymer or the Tg of each stage in a multistage first polymer may be adjusted to obtain desired properties. For example, a first polymer or first polymer stage having a higher Tg (for example, a Tg of about 30 to about 230° C.) may be employed to adjust finished film properties such as film hardness or scrub resistance. A first polymer or first polymer stage having a lower Tg (for example, a Tg of about −65 to about 30° C.) may be employed to adjust film formation properties such as the minimum film-forming temperature (MFFT), or to make the first polymer self-coalescing without requiring a coalescent. The first polymer particles may include vesicles or other voids, or may be free of voids. Exemplary commercially available first polymers include EVOQUE 1140, EVOQUE 1180, EXP-4340 and EXP-4463 pre-composite polymer from Dow Chemical Company, FASTRACK HE-2706 high efficiency binder from Dow Chemical Company and mixtures thereof.

The disclosed pigment grind dispersions may employ a variety of water-insoluble film-forming second polymer particles (the "second polymer") that do not by themselves form composite particles with (for example, do not adsorb to) the titanium dioxide particles. Exemplary second polymers typically are waterborne addition polymers formed by the aqueous emulsion polymerization of one or more ethylenically unsaturated monomers that do not contain pendant groups sufficient to cause interfering adsorption of the second polymer particles to titanium dioxide particles. Exemplary second polymers include acrylic emulsions, ethylene vinyl acetate emulsions, polybutadiene emulsions, polyvinylidene emulsions, styrene acrylic emulsions, vinyl acrylic emulsions and vinyl acetate-vinyl versatate emulsions and mixtures thereof, with latex emulsions (e.g., acrylic latex emulsions) being preferred. The second polymer emulsions normally contain at least the second polymeric particles, water, and one or more emulsifiers. The second polymer particles may include one or more functional groups capable of reacting with an external crosslinker, and such external crosslinker may also be a part of the disclosed coating compositions. For example, the second polymer particles may include hydroxyl-functional groups capable of reacting with an amino resin or polyisocyanate crosslinker. Exemplary such amino resins include waterborne coating-compatible melamine, urea and glycoluril crosslinkers available from suppliers such as Cytec Industries Inc., including CYMEL™ 328 and CYMEL 383 aminoplast resins. Exemplary such polyisocyanate crosslinkers include waterborne coating-compatible polyisocyanate crosslinkers available from suppliers such as Bayer MaterialScience, including BAYHYDUR™ 304 and BAYHYDUR 3100 polyisocyanates. The second polymer particles may also include functional groups capable of reacting with a waterborne coating-compatible polyepoxide crosslinker, or epoxy-functional groups capable of reacting with a waterborne coating-compatible epoxy curative. Exemplary such epoxy curatives include ANQUAMINE™ 721 water-reducible epoxy curative from Air Products and Chemicals, Inc. and BECKOPDX™ EH 2179W/65WA water-reducible epoxy curative from Cytec Industries, Inc. The second polymer particles may also or instead include one or more functional groups capable of undergoing an internal crosslinking reaction (viz., a so-called self-crosslinking polymer), or may harden without requiring a crosslinking or other curing reaction for dry film formation to take place shortly after application. In some embodiments it will be desirable to employ a softer second polymer that does not require a volatile coalescent for film formation, and to employ an internal or external crosslinking agent to promote film formation. Exemplary second polymers may be prepared as described for example in U.S. Pat. No. 8,293,361 B2 (Killilea et al.) or obtained from a variety of commercial sources. Exemplary commercially available second polymers include ALBERDINGK AC 2514, ALBERDINGK AC 25142, ALBERDINGK AC 2518, ALBERDINGK AC 2523, ALBERDINGK AC 2524, ALBERDINGK AC 2537, ALBERDINGK AC 25381, ALBERDINGK AC 2544, ALBERDINGK AC 2546, ALBERDINGK MAC 24, and ALBERDINGK MAC 34 emulsions from Alberdingk Boley, Inc.; AQUAMAC 720 emulsion from Hexion Specialty Chemicals; EPS 2538 acrylic latex, EPS 2540 styrene acrylic latex, EPS 2771 acrylic emulsion and EPS 2725 acrylic latex emulsions from EPS Corp.; RESYN™ 7305 vinyl acrylic emulsion from Celanese Emulsion Polymers; RHOPLEX™ 3131-LO, RHOPLEX™ AC-1020, RHOPLEX E-693, RHOPLEX E-940, RHOPLEX E-1011, RHOPLEX E-2780, RHOPLEX HG-95P, RHOPLEX HG-700, RHOPLEX HG-706, RHOPLEX PR-33, RHOPLEX TR-934HS, RHOPLEX TR-3349, RHOPLEX VSR-1050 and RHOPLEX VSR-2015 acrylic emulsions from Rohm and Haas Co.; RHOSHIELD™ 636, RHOSHIELD 3188 and RHOSHIELD 3275 emulsions from Rohm and Haas Co.; JONCRYL™ 538, JONCRYL 1552, JONCRYL 1972, JONCRYL 1980, JONCRYL 1982, JONCRYL 1984, JONCRYL 1987 and JONCRYL 8383 acrylic emulsions from BASF Resins; NEOCRYL™ A-1127, NEOCRYL A-6115, NEOCRYL XK-12, NEOCRYL XK-90, NEOCRYL XK-98 and NEOCRYL XK-220 acrylic latex polymers from DSM NeoResins, Inc., and mixtures thereof.

The disclosed pigment grind dispersions contain (and the disclosed methods may employ) water, which may be tap, deionized, distilled, reverse osmosis or recycled water. Preferably the pigment grind dispersion contains sufficient water to facilitate efficient pigment grind mixing (e.g., about 20 to about 80 weight percent water based on the weight of ingredients in the pigment grind dispersion), and a final coating composition made from such a dispersion preferably contains sufficient water so that about 20 to about 80 weight percent solids and more preferably about 35 to about 65 weight percent solids are present when the composition is applied to a substrate.

The ingredient amounts in the disclosed pigment grind dispersions will to some extent depend upon the other ingredients present and may be empirically determined. As an example, the titanium dioxide PVC level and desired film former binder amounts in the final coating composition may be used to estimate initial ingredient amounts in the pigment grind dispersion. In general, higher PVC levels will require larger first and second polymer amounts in the pigment grind dispersion. When the first and second polymers are the only film formers in the final coating composition, then increases in the first polymer amount may be offset by decreases in the second polymer amount, and vice versa. The first polymer particle amount is as noted above less than the saturation level of adsorption when another polymer is not present. The first polymer saturation level of adsorption may be determined using techniques such as microscopy or viscosity studies on the pigment grind dispersion to establish the level at which the amount of first polymer adsorbed per unit of titanium dioxide particles plateaus in the absence of the second polymer. A second polymer amount sufficient to inhibit or interfere with adsorption of the first polymer particles to the titanium dioxide particles may be established by dispersing the titanium dioxide particles into varying amounts of the second polymer particles, adding an amount (e.g., a saturation level amount or the amount actually employed) of the first polymer particles and noting the second polymer concentration at which the viscosity increase caused by titanium dioxide pigment-first polymer composite particle formation in the absence of the second polymer is reduced or at which its onset is noticeably slowed.

As a further guide, a formulator may determine the amounts of titanium dioxide particles and second polymer needed to achieve a finished paint or other coating composition with desired PVC and hiding power characteristics without using the first polymer. A first polymer amount is then chosen to provide efficient use of titanium dioxide particles and the desired hiding power at the saturation level and optionally at less than the saturation level. As a general guide for use with an aqueous first polymer emulsion containing about 45 wt. % solids and a titanium dioxide slurry containing about 75 wt. % solids, the first polymer may be employed at a wet weight (viz., the weight of a dispersion including its solids and vehicle) corresponding to about 50 to about 200 percent of the titanium dioxide particle wet weight, with amounts around 50 to 150 percent, 50 to 100 percent or 60 to 80 percent being preferred. These amounts may be adjusted as needed for use with first polymer emulsions containing other solids levels (for example, solids levels of about 30 to 60 or at about 40 to 50 wt. %) and titanium dioxide slurries containing other solids levels (for example, solids levels of about 40 to 85 or about 50 to about 75 wt. %). The second polymer amount may be reduced by an amount corresponding to the first polymer volume solids, so as to maintain a constant PVC level in the starting point and adjusted coating compositions. The titanium dioxide amount may for example be sufficient to provide a pigment dispersion having a titanium dioxide PVC of at least about 21, at least about 22, at least about 23, at least about 24, at least about 25, at least about 26, at least about 27 or at least about 30, and up to about 50, up to about 45 or up to about 40. The selected titanium dioxide level may for example also be sufficient to provide a pigment grind dispersion having a TCR of at least about 33, at least about 35, at least about 37, or at least about 40, and up to about 60, up to about 50 or up to about 45. Somewhat higher PVC levels may be desirable at lower TCR levels, and somewhat lower PVC levels may be desirable at higher TCR levels. The disclosed method and pigment grind dispersion can provide improved storage stability (for example, avoidance of undesirable changes in viscosity, such as rapid viscosity increases), reduced grit (viz., solid particle) formation, or both improved storage stability and reduced grit formation compared to pigment grind dispersions prepared using previously-recommended methods. Improved storage stability, reduced grit formation or both improved storage stability and reduced grit formation are useful for a variety of reasons including facilitating inventory management, process control and process improvement in large-scale mixing of paints and other coating compositions. The pigment grind dispersion in the finished coating composition formulation preferably will contain about 27 to about 37 weight percent titanium dioxide particles, about 18 to about 49 weight percent first polymer particles, and about 55 to about 14 weight percent second polymer particles, based on the dry weights of these particles compared to the total dry weight of ingredients in the pigment grind dispersion.

The disclosed pigment grind dispersions may include optional ingredients that assist with or do not unduly interfere with pigment dispersion, such as extender particles, dispersing agents, defoamers, wetting agents and mixtures thereof. Exemplary extender particles may for example have an index of refraction similar to that of a dried film of the second polymer, and may for example not significantly scatter visible light or may flatten the dried coating appearance. The extender particle index of refraction may for example be less than 1.8 and greater than or equal to 1.3. The extender particles may for example be small particles having an average particle diameter less than or equal to twice the average particle diameter of the titanium dioxide pigment-polymer composite particles, or large particles having an average particle diameter greater than twice the average particle diameter of the titanium dioxide pigment-polymer composite pigment particles. Exemplary extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, talc, mixtures thereof and other materials that will be familiar to persons having ordinary skill in the art.

Exemplary dispersing agents include anionic polyelectrolyte dispersants such as maleic acid copolymers, acrylic acid copolymers including methacrylic acid copolymers, and carboxylic acids such as tartaric acid, succinic acid, citric acid, itaconic acid, mixtures thereof and other materials that will be familiar to persons having ordinary skill in the art.

Exemplary defoamers include silicones, ethylene oxide propylene oxide copolymers, oils and waxes such as FOAMSTAR™ A-32, FOAMSTAR A-34, FOAMSTAR A-36, FOAMSTAR A-38, FOAMSTAR A-39, FOAMASTER™ 111, FOAMASTER 333 and FOAMASTER SA-3 from Cognis, TEGO™ FOAMEX™ 810 from Evonik, mixtures thereof and other materials that will be familiar to persons having ordinary skill in the art, including products from other suppliers such as Air Products and Chemicals, Ashland, BASF, BYK-Gardner USA, Cytec, Rhone Poulenc and Troy Corporation.

The amounts of such optional pigment grind dispersion ingredients will normally be empirically determined. For example, the pigment grind dispersion may contain from zero to more than 100 weight percent extender pigment based on the weight of titanium dioxide pigment. Depending on the type of dispersing agent, the dispersing agent amount may for example be about 0.3 to about 5 weight percent based on the total pigment weight in the pigment grind dispersion.

Other ingredients that may be included in the pigment grind dispersion include cosolvents, wetting agents, surfactants, biocides, and pigments other than titanium dioxide. Normally however such other ingredients will be added during a subsequent stage rather than being added to the pigment grind dispersion.

The disclosed composite particles may be prepared by mixing together aqueous emulsions containing the disclosed first and second polymer particles and if need be adjusting the water level and shear rate to provide a circulating aqueous emulsion containing a uniform mixture of the first and second polymer particles. The disclosed titanium dioxide particles are desirably next added in dry or preferably in slurry form. The order of mixing may be reversed, that is by adding the circulating aqueous emulsion containing a uniform mixture of the first and second polymer particles to a slurry of the titanium dioxide particles. The mixture of first polymer particles, second polymer particles and titanium dioxide particles is in any event desirably subjected to further mixing or otherwise circulated to allow sufficient time for the first polymer particles and titanium dioxide particles to form the disclosed composite particles. The required time will depend upon a variety of factors including the chosen titanium dioxide particle type, amount and surface treatment or coating if any; the respective types and amounts of first and second polymer particles; the optional dispersant type and amount; the circulation method and shear rate; and temperature. The time required for attainment of a suitable equilibrium level of composite particle formation may for example be from about 5 minutes up to about 2 hours, with shorter or longer times being necessary or desirable in some instances. The resulting pigment grind dispersion contains the disclosed composite particles, and may be combined with additional ingredients to form a finished coating composition. The dispersion may instead be stored for an appropriate time period and later used to make a finished coating composition. Some embodiments of the disclosed pigment grind dispersions appear to have better storage stability than composite particle-containing pigment grind dispersions prepared via conventional methods.

The final coating composition is completed by combining the pigment grind dispersion with the remaining coating composition ingredients. The final coating composition thus includes the above-described pigment grind dispersion together with one or more additional optional ingredients such as film-forming polymers; opacifying non-film-forming copolymers; coalescents; cosolvents or plasticizers; thickeners and other rheology modifiers; pigments other than titanium dioxide; surfactants or dispersants (aside from those which already may be present in the first or second polymers), additional water, and other adjuvants. The additional film-forming polymer desirably is the above-mentioned second polymer but may be other film-forming polymers that will be familiar to persons having ordinary skill in the art. The amounts and types of such additional film-forming polymers may vary widely and typically will be empirically selected.

Exemplary opacifying non-film-forming copolymers polymers include those described in, e.g., U.S. Pat. No. 4,885,320 (Biale), U.S. Pat. No. 5,663,213 (Jones et al.) and U.S. Pat. No. 6,646,058 B1 (Koger), and in Published U.S. Patent Application Nos. US 2009/0162558 A1 (Bardman et al. '558) and US 2010/0166967 A1 (Fasano), as well as commercially available opacifying non-film-forming copolymers such as OPAQUE™ OP-62, OPAQUE OP-96 and OPAQUE™ ULTRA opaque polymers from Dow Chemical Company. When an opacifying non-film-forming copolymer is present, the coating compositions preferably contain about 2 to about 9 weight percent opacifying non-film-forming copolymer based on the final coating composition weight.

Coalescents may assist in coalescing a film-forming emulsion polymer into a continuous film. Exemplary coalescents include benzoates such as alkyl benzoates, monobenzoates and dibenzoates; hexanoates such as OPTIFILM™ 400 tri(ethylene glycol) bis(2-ethylhexanoate) from Eastman Chemical Co.; dioctyl maleate; oleic acid propylene glycol esters such as EDENOL™ EFC-100 from Cognis having the formula $HOCH(CH_3)CH_2OC(O)(CH_2)_7CH=CH(CH_2)_7CH_3)$; UCAR Filmer IBT, UCAR n-propyl propionate, UCAR n-butyl propionate and UCAR n-pentyl propionate from DOW Chemical Co.; and TEXANOL™ ester alcohol from Eastman Chemical Co.; materials discussed in U.S. Pat. Nos. 6,762,230 B2, 7,812,079 B2 and 8,110,624 B2 (collectively, Brandenburger et al.) and in U.S. Pat. No. 8,106,239 B2 (Zhou et al.) and U.S. Pat. No. 8,394,496 B2 (Foster et al.), in U.S. Published Patent Application No. US 2009/0149591 A1 (Yang et al.); mixtures thereof and the like. When a coalescent is present, the coating compositions preferably contain about 0.05 to about 10 or about 0.05 to about 5 weight percent coalescent based on the final coating composition weight.

Cosolvents may assist in mixing or coating the composition; may speed up, retard or otherwise change the time or emissions associated with drying; may improve wet edge properties or overlap characteristics; may improve freeze-thaw protection, or may provide or improve other features, and generally will not be retained in a film of the dried, cured or otherwise hardened coating composition. A chosen cosolvent may be hazardous air pollutant solvent (HAPS material) but preferably is a non-HAPS material or is substantially free of HAPS materials. Exemplary cosolvents may for example include glycols (e.g., ethylene glycol and diethylene glycol), glycol ethers (e.g., DOWANOL™ DPM and Butyl CELLOSOLVE™ from Dow Chemical Co.), alcohols (e.g., n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethylnonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.), ketones (e.g., diisobutyl ketone and ECOSOFT™ Solvent IK from Dow Chemical Co.), CARBOWAX™ 300 and CARBOWAX 600 polyethylene from Dow Chemical Co., mixtures thereof and the like. When a cosolvent is present, the coating compositions preferably contain about 0.1 to about 10 or about 2 to about 5 weight percent cosolvent based on the final coating composition weight.

Plasticizers may improve cured film flexibility, or may provide or improve other features, and generally will be retained in a film of the dried, cured or otherwise hardened coating composition. In some formulations a plasticizer may perform functions associated with or may be identified as a coalescent. Exemplary plasticizers include CITROFLEX™ 4 citric acid ester from Vertellus Specialties Inc. and PARAPLEX™ G-30, PARAPLEX G-41, PARAPLEX G-60, PARAPLEX RGA-2 and PARAPLEX WP-1 plasticizers from Dow Chemical Co. When a plasticizer is present, the coating compositions preferably contain about 0.1 to about 10 or about 2 to about 5 weight percent plasticizer based on the final coating composition weight.

Exemplary thickeners and other rheology modifiers include sedimentation inhibitors, hydrophobic ethoxylated urethane resin (HEUR) thickeners, hydrophobically-modified, alkali-soluble or alkali-swellable emulsion (HASE) thickeners), cellulosic thickeners, polysaccharide thickeners and mixtures thereof. Exemplary commercially-available rheology modifiers include NATROSOL™ 250 and the AQUAFLOW™ series from Ashland, ATTAGEL™ 50 from BASF Corp., the CELLOSIZE™ series and UCAR POLYPHOBE™ T-900 and T-901 from Dow Chemical Co., BENTONE™ AD and BENTONE EW from Elementis Specialties, LATTICE™ NTC-61 from FMC Biopolymer and ACRYSOL™ RM-6, ACRYSOL RM-8, ACRYSOL RM-12W and ACRYSOL RM-2020NPR all from Rohm & Haas. When a rheology modifier is present, the coating compositions preferably contain about 0.1 to about 3 or about 0.5 to about 3 weight percent rheology modifier based on the final coating composition weight.

Exemplary other pigments include those described in U.S. Pat. No. 8,141,599 B2 (Korenkiewicz et al.) and U.S. Patent Application Publication No. US 2012/0004359 A1 (Cavallin et al.). The amounts and types of such other pigments may vary widely and typically will be empirically selected to provide a desired coating composition tint.

Exemplary surfactants or dispersants include anionic, amphoteric and nonionic materials. Commercially-available surfactants or dispersants include the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, Inc. and others, various members of the SURFYNOL™ series from Air Products and Chemicals, Inc. (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E. I. DuPont de Nemours and Co. and other suppliers, and phosphate esters from Ashland, Rhodia and other suppliers. When a surfactant or dispersant is present, the coating compositions preferably contain about 0.1 to about 10 weight percent and more preferably about 1 to about 3 weight percent surfactant or dispersant based on the total composition weight.

The disclosed coating compositions may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include anti-cratering agents; biocides, fungicides, mildewcides and preservatives (e.g., BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy Corporation); curing indicators; heat stabilizers; leveling agents; light stabilizers (e.g., hindered amine light stabilizers such as TINUVIN™ 123-DW and TINUVIN 292 HP from Ciba Specialty Chemicals); optical brighteners; ultraviolet light absorbers (e.g., TINUVIN 234 and TINUVIN 1130 from Ciba Specialty Chemicals); wetting agents (e.g., BYK™ 346 and BYK 348 from Altana, PENTEX™ 99 from Rhodia and TROYSOL LAC™ from Troy corporation); waxes (e.g., AQUACER™ 593 from Altana, HYDROCER™ 303 from Shamrock Technologies, Inc. and MICHEM™ Emulsion 32535 from Michelman, Inc.); and the like. The types and amounts of these and other adjuvants typically will be empirically selected.

The disclosed coating compositions may be packaged in any convenient packaging suitable for storing a desired quantity of the coating composition without premature gelation, undue separation or other undesirable degradation during storage. Exemplary packaging containers include cans, pails, bottles, drums, totes and tanks. The disclosed compositions may be factory-applied to substrates such as building components at a manufacturing site, or may be supplied to end users and applied onsite to finished articles, e.g., as paints for use on decks, siding, roofing or other surfaces.

The coating compositions may be applied to a variety of substrates including metals (including aluminum, brass, copper, iron, pot metal, steel, tin and zinc), woods (including engineered woods, impregnated woods and wood-derived materials), plastics (including thermoplastics and thermosets), composites, and other materials that will be familiar to persons having ordinary skill in the art.

The coating compositions may be applied using a variety of methods that will be familiar to persons having ordinary skill in the art, including spraying (e.g., air-assisted, airless or electrostatic spraying), brushing, roller coating, flood coating and dipping. The compositions may be applied at a variety of wet film thicknesses. Preferably the wet film thickness is such as to provide a dry film thickness of about 13 to about 260 µm (about 0.5 to about 10 mil) and more preferably about 25 to about 75 µm (about 1 to about 3 mil) for the dried coating. The applied coating may be cured by allowing it to air dry or by accelerating curing using a variety of drying devices (e.g., ovens) that will be familiar to persons having ordinary skill in the art. Preferred heating temperatures for curing the coating compositions are about 50° to about 65° C., and more preferably about 60° to about 65° C., and preferred heating times are at least three minutes and less than 60 minutes, less than 45 minutes, less than 30 minutes, less than 15 minutes, less than 10 minutes, less than six minutes or less than five minutes. The heating time will tend to decrease with increased temperature, increased airflow or decreased humidity.

The invention is further illustrated in the following non-limiting examples, in which all parts and percentages are by weight unless otherwise indicated. In several of the examples, tint strength was evaluated using both untinted (base paint) and tinted samples. The tinted samples were prepared by adding 11.1 mL (3/8 fluid ounce) thalo green colorant to 0.47 L (1 pint) of the base paint and mixing the resulting tinted paint on a paint shaker for 5 minutes to incorporate the colorant. Tint strength was then determined by casting 0.1 mm (4 mil) wet thickness films of the untinted and tinted samples on sealed PENOPAC™ panels (Leneta Co., BYK-Gardner USA), allowing the panels to dry under ambient conditions for 30 minutes followed by 30 minutes in a 50° C. (122° F.) oven, and evaluating the dried paint film reflectance values using a DATACOLOR™ 600 spectrophotometer from Datacolor operated with a D65 light source, an 8° angle of reflectance, a large area view using the included diffuse specular reflection sphere and a 10° observation angle. The results were reported as the untinted or tinted L* values. Untinted paint samples were also assessed for contrast ratio (hiding power) according to ASTM method D-2805, using dried drawdowns on Form 3B Leneta charts prepared at a 0.1 mm (4 mil) wet film thickness. Viscosity was evaluated using a BROOKFIELD™ Model No. CAP-1000+L high shear ICI cone and plate viscometer with a No. 2 spindle operated at 900 rpm and 25° C. (77° F.) and reported in poise (P), or evaluated using a BROOKFIELD Model KU-2 Stormer viscometer with its standard paddle blade operated at the fixed machine speed and 25° C. and reported in Krebs units (KU). Storage stability of pigment grind dispersions was evaluated using a TA Instruments Model No. AR2000EX rheometer with a temperature-controlled Peltier plate operated at 25° C. Storage stability of finished coating compositions was evaluated by storing a sealed 0.47 L (1 pint) finished paint sample in a 49° C. (120° F.) oven for one week, removing the sample and inspecting it to ascertain if any separation occurred, and then measuring viscosity using the Stormer viscometer and measuring 60° gloss using a Byk Gardner MICRO-GLOSS handheld gloss meter.

Comparison Example A and Examples 1-3

Pigment grind dispersions were prepared by combining and mixing the ingredients listed below in Table 1, and then combining the dispersions with additional ingredients as indicated to make finished paint formulations. The ingredients in Comparison Example A were combined in a manner like that recommended in a May, 2011 Dow Chemical Co. Technical Data Sheet entitled "EVOQUE Pre-Composite Polymer Technology Technical Data", but with ingredient and mixing adjustments to make a semigloss paint rather than a flat paint. The ingredients in Examples 1-3 were combined according to the present invention. A number of adjuvants could be freely substituted for ingredients present in minor amounts, so those ingredients were identified generally rather than specifically. No separation was observed following oven aging. The Example 1 formulation contained about 46.5 wt. % solids and about 36 g/L VOCs. Other properties for the Comparison Example A and Example 1-3 formulations are shown below in Table 2.

TABLE 1

| Ingredient | Comparison Example A, Parts | Example 1, Parts | Example 2, Parts | Example 3, Parts |
|---|---|---|---|---|
| INITIAL MIXTURE (PRE-LETDOWN): | | | | |
| Water | 39.5 | 39.5 | 39.5 | 39.5 |
| First polymer (EVOQUE ™ 1140) | 285 | 285 | 242 | 200 |
| Second polymer (RHOPLEX ™ VSR-1050) | | 146 | 183 | 221 |
| Defoamer | 1 | 1 | 1 | 1 |
| TiO$_2$ slurry (75 wt. % KRONOS ™ 4310) | 285 | 285 | 285 | 285 |
| Ratio, first polymer emulsion: TiO$_2$ slurry | 1:1 | 1:1 | 0.85:1 | 0.70:1 |
| Water | 25 | 25 | 25 | 25 |
| Stir for 10-20 minutes | | | | |
| Second polymer (RHOPLEX ™ VSR-1050), added w/stirring | 146 | | | |
| GRIND: | | | | |
| Water | 65 | 65 | 65 | 65 |
| Antisettling agent | 2 | 2 | 2 | 2 |
| pH buffer (AMP-95) | 2.5 | 2.5 | 2.5 | 2.5 |
| Coalescent (TEXANOL ™) | 3 | 3 | 3 | 3 |
| Cosolvent (ethylene glycol) | 5 | 5 | 5 | 5 |
| Dispersant (TAMOL ™ 1124) | 2.5 | 2.5 | 2.5 | 2.5 |
| Defoamer | 2 | 2 | 2 | 2 |
| Extender pigment (IMSIL ™ A-10) | 20 | 20 | 20 | 20 |
| Preservative | 1.6 | 1.6 | 1.6 | 1.6 |
| Mix in High Speed Disperser 20 minutes | | | | |
| LETDOWN (ADDED TO THE GRIND): | | | | |
| Mildewcide | 2 | 2 | 2 | 2 |
| Surfactant 1 | 2 | 2 | 2 | 2 |

TABLE 1-continued

| Ingredient | Comparison Example A, Parts | Example 1, Parts | Example 2, Parts | Example 3, Parts |
|---|---|---|---|---|
| Mix 2 minutes | | | | |
| Add to Pre-Letdown | | | | |
| Water (to rinse grind kettle) | 30 | 30 | 30 | 30 |
| HEUR thickener (ACRYSOL ™ RM-2020NPR) | 25 | 25 | 25 | 25 |
| HASE thickener (ACRYSOL RM-6) | 14 | 14 | 14 | 14 |
| HASE thickener (1.9 wt. % UCAR POLYPHOBE ™ TR-116) | 10.5 | 10.5 | 10.5 | 10.5 |
| Defoamer | 2 | 2 | 2 | 2 |
| Opaque polymer (ROPAQUE ™ ULTRA) | 65 | 65 | 65 | 65 |
| Surfactant 2 | 1 | 1 | 1 | 1 |
| Wetting agent | 2 | 2 | 2 | 2 |
| TOTAL PARTS | 1034 | 1034 | 1034 | 1034 |

TABLE 2

| | Comparison Example A | Example 1 | Example 2 | Example 3 |
|---|---|---|---|---|
| Tint Strength, L* | 84.11 | 84.16 | 84.02 | 83.98 |
| Contrast Ratio, 0.1 mm (4 mil) | 99.03 | 99.36 | 99.35 | 99.13 |
| Viscosity, P | 1.467 | 1.579 | 1.546 | 1.579 |
| Viscosity, KU | 96.0 | 100.0 | 100.3 | 99.0 |
| Oven-Aged Viscosity, KU | | 103.0 | 104.2 | 102.2 |
| Oven-Aged 60° Gloss | 39.2 | 38.1 | 38.4 | 38.9 |

As shown in Table 2, the Example 1 formulation exhibited better tinted L* and contrast ratio values than the Comparison Example A composite paint made with EVOQUE pre-composite polymer according to the manufacturer's directions, and a slight reduction in oven-aged 60° gloss. The contrast ratio results were especially promising, and indicate the Example 1 paint should provide very good one coat hiding properties. They also indicate that the paint formulation could be adjusted (e.g., by reducing the titanium dioxide content, first polymer content or both) to provide a paint with tinted L* and contrast ratio values like those in Comparison Example A but at a reduced raw material cost. Examples 2 and 3 explored one such adjustment, in which the first polymer amount was reduced to 85% or 70% of the amount employed in Example 1, with a corresponding upwards adjustment in the amount of the less expensive second polymer. The first polymer amount in Example 1 was at approximately the saturation level, whereas the first polymer amounts in Examples 2 and 3 were well below the saturation level. The results in Table 2 show that the tinted L* values were slightly reduced but that improved contrast ratio values (compared to the Comparison Example A contrast ratio) were maintained. For these paint formulations, the contrast ratio improvement had greater overall significance than the slight decrease in the tinted L* value.

Comparison Example B and Example 4

Using the methods employed for Comparison Example A and Example 1, Comparison Example B was prepared using none of the first polymer, 285 parts of the titanium dioxide slurry and 410 parts of the second polymer, and Example 4 was prepared using 115 parts of the first polymer, 285 parts of the titanium dioxide slurry and 110 parts of the second polymer. No separation was observed following oven aging. Other properties for the Comparison Example B and Example 4 formulations are shown below in Table 3.

TABLE 3

| | Comparison Example B | Example 4 |
|---|---|---|
| Tint Strength, L* | 82.66 | 84.15 |
| Contrast Ratio, 0.1 mm (4 mil) | 98.39 | 99.18 |
| Viscosity, P | 1.171 | 1.537 |
| Viscosity, KU | 88.0 | 100.2 |
| Oven-Aged Viscosity, KU | — | 103.0 |
| Oven-Aged 60° Gloss | 39.2 | 38.1 |

Comparison Example C and Examples 5-6

Using the methods employed for Comparison Example A and Example 1, pigment grind dispersions were prepared by combining and mixing the ingredients listed below in Table 4, and then combining the dispersions with additional ingredients as indicated to make finished paint formulations. No separation was observed following oven aging. The Example 5 and 6 formulations contained about 1.8 g/L VOCs. Other properties for the Comparison Example C and Example 5-6 formulations are shown below in Table 5.

TABLE 4

| Ingredient | Comparison Example C, Parts | Example 5, Parts | Example 6, Parts |
|---|---|---|---|
| INITIAL MIXTURE (PRE-LETDOWN): | | | |
| Water | 35 | 35 | 35 |
| First polymer (EVOQUE 1140) | 202 | 202 | 202 |
| Second polymer (RHOPLEX VSR-1050) | | 215 | 108 |
| TiO₂ slurry (75 wt. % KRONOS 4310) | 269 | 269 | 269 |
| Ratio, first polymer emulsion: TiO₂ slurry | 0.75:1 | 0.75:1 | 0.75:1 |

TABLE 4-continued

| Ingredient | Comparison Example C, Parts | Example 5, Parts | Example 6, Parts |
| --- | --- | --- | --- |
| Water | 10 | 10 | 10 |
| Defoamer | 1 | 1 | 1 |
| Stir for 10-20 minutes | | | |
| Second polymer (RHOPLEX VSR-1050), added w/stirring | 215 | | 108 |
| GRIND: | | | |
| Water | 100 | 100 | 100 |
| Antisettling agent | 2 | 2 | 2 |
| Plasticizer (dioctyl maleate) | 2 | 2 | 2 |
| Dispersant (TAMOL 731) | 4.5 | 4.5 | 4.5 |
| Defoamer | 0.5 | 0.5 | 0.5 |
| Extender pigment (IMSIL A-10) | 22 | 22 | 22 |
| Preservative | 1.67 | 1.67 | 1.67 |
| Mix in High Speed Disperser 20 minutes | | | |
| LETDOWN (ADDED TO THE GRIND): | | | |
| Mildewcide | 2 | 2 | 2 |
| Surfactant 1 | 2 | 2 | 2 |
| Mix 2 minutes | | | |
| Add to Pre-Letdown | | | |
| Water (to rinse grind kettle) | 40 | 40 | 40 |
| HEUR thickener (AQUAFLOW ™ NHS-310) | 40 | 40 | 40 |
| HEUR thickener (AQUAFLOW XLS-525) | 8 | 8 | 8 |
| Defoamer | 2 | 2 | 2 |
| Opaque polymer (ROPAQUE ULTRA) | 65 | 65 | 65 |
| Wetting agent | 1 | 1 | 1 |
| TOTAL PARTS | 1025 | 1025 | 1025 |

TABLE 5

| | Comparison Example C | Example 5 | Example 6 |
| --- | --- | --- | --- |
| Tint Strength, tinted L* | 83.52 | 83.56 | 83.67 |
| Tint Strength, untinted L* | 98.17 | 98.19 | 98.22 |
| Contrast Ratio, 0.1 mm (4 mil) | 98.88 | 99.06 | 99.02 |
| Viscosity, P | 1.404 | 1.437 | 1.496 |
| Viscosity, KU | 100.2 | 100.3 | 100.6 |
| Oven-Aged Viscosity, KU | 99.7 | 99.8 | 99.2 |
| Oven-Aged 60° Gloss | 42.8 | 42.9 | 42.7 |

As shown in Table 5, the Example 5-6 formulations exhibited excellent properties including improved contrast ratios.

Example 7

Figure 2:
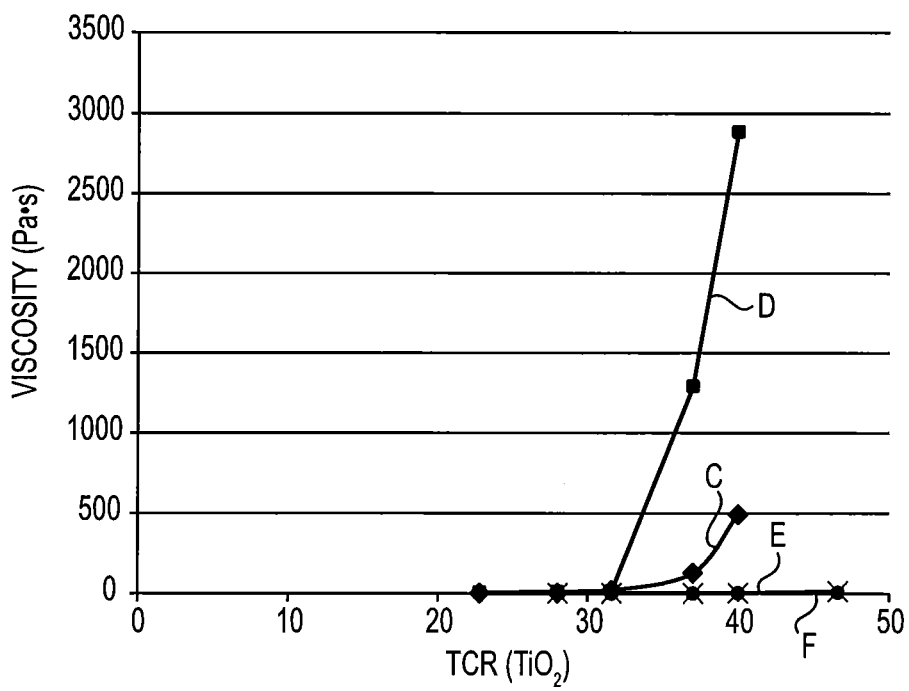
FIG. 2 is a graph showing viscosity for a series of composite particle-containing pigment grind dispersions prepared according to the manufacturer's recommendation or prepared according to the present invention, and measured one hour and 24 hours after composite formation.

Using the methods of Comparative Example A and Example 1, a series of composite particle dispersions containing varying amounts of the first polymer and titanium dioxide were prepared and stored. The dispersions were evaluated to determine whether their viscosity changed during storage. The results are shown in FIG. 1 and FIG. 2, with FIG. 1 illustrating a plot of viscosity in poise at a 0.05/s shear rate on the vertical axis vs. the TCR value on the horizontal axis for pigment grind dispersions evaluated one hour after composite formation. Curve A shows the viscosity of five formulations prepared like Comparative Example A, and Curve B shows the viscosity of five formulations prepared according to the present invention and as in Example 1. FIG. 1 shows a steep increase in viscosity for higher-TCR pigment grind dispersions prepared from EVOQUE pre-composite polymer and mixed according to the manufacturer's directions, and little or no increase in viscosity for both lower and higher TCR pigment grind dispersions prepared according to the present invention.

FIG. 2 shows a similar plot of viscosity vs TCR value for the same pigment grind dispersions evaluated at one hour and 24 hours after composite formation. Curves C and D respectively show the viscosities of five formulations prepared like Comparative Example A at one hour and 24 hours after composite formation. Curves E and F (which overlay one another) respectively show the viscosities of five formulations prepared according to the present invention as in Example 1 at one hour and 24 hours after composite formation. The results in FIG. 1 and FIG. 2 show that pigment grind dispersions prepared according to the present invention have improved storage stability.

Example 8

Using the ingredients employed in Example 1, several titanium dioxide pigment-polymer composite particle dispersions were prepared and stored. Each composite particle dispersion included sufficient ingredients and added water to provide 37% non-volatile material by volume (NVV). Two preparation methods were employed, and were respectively identified as Method A and Method B. Method A is a method of the invention, and Method B is the method recommended by the first polymer supplier. In Method A, a letdown containing all water in the formulation and the first and second polymers was mixed and then a titanium dioxide slurry was added to the mixture and mixed for a further 15 minutes. In Method B, a letdown containing an aqueous dispersion of the first polymer was mixed, a titanium dioxide slurry was added to the mixture and mixed for a further 15 minutes, and the remaining water in the formulation and the second polymer were added and mixed for an additional 15 minutes. The resulting composite particle dispersions were allowed to stand for 5 days at room temperature, filtered through a 240 micrometer screen and rinsed with cold water to remove soluble residues. The filtrate was dried overnight in a 49° C. (120° F.) oven to remove water and then weighed. The filter medium mass was subtracted from the total mass to determine the grit content. The amounts of first polymer, second polymer and titanium dioxide in each sample are shown below in Table 6, with both the total mass of each component (including water in the component as supplied) and the percent non-volatile materials by mass (NVM) of each component being reported. The grit amounts after storage are shown below in Table 7, along with the calculated NVV, TCR and PVC values. TCR values were determined as:

$$TCR = (\text{Volume Solids TiO}_2)/(\text{Volume solids TiO}_2 + \text{Volume Solids EVOQUE 1140})$$

PVC values were determined as:

$$PVC = (\text{Volume Solids TiO}_2)/(\text{Volume solids TiO}_2 + \text{All Latex Volume Solids})$$

Figure 3:
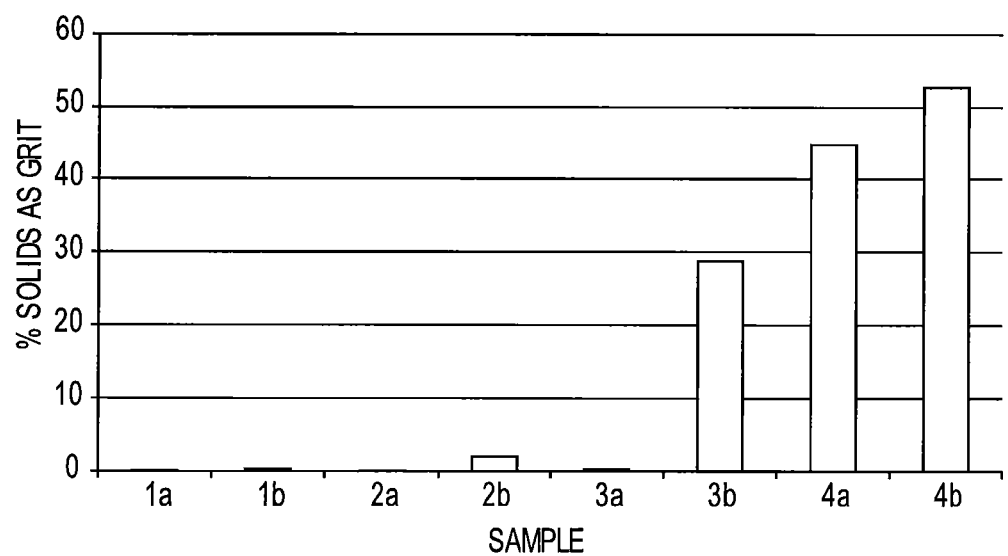
FIG. 3 is a graph showing percent solids as grit for a series of composite particle-containing pigment grind dispersions prepared according to the manufacturer's recommendation or prepared according to the present invention, and measured five days after composite formation.

The grit content in each sample as a percent of total non-volatile materials is also shown graphically in FIG. 3.

TABLE 6

| Sample | Method | First Polymer (EVOQUE 1140) | | Second Polymer (RHOPLEX VSR-1050) | | TiO₂ (KRONOS 4310) | | Second Polymer (RHOPLEX VSR-1050) | |
|---|---|---|---|---|---|---|---|---|---|
| | | grams | NVM | grams | NVM | grams | NVM | grams | NVM |
| 1a | A | 93.66 | 43.55 | 36.29 | 17.96 | 100.00 | 75.00 | | |
| 1b | B | 93.66 | 43.55 | | | 100.00 | 75.00 | 36.29 | 17.96 |
| 2a | A | 93.66 | 43.55 | 8.64 | 4.28 | 100.00 | 75.00 | | |
| 2b | B | 93.66 | 43.55 | | | 100.00 | 75.00 | 8.64 | 4.28 |
| 3a | A | 53.65 | 24.95 | 73.73 | 36.50 | 100.00 | 75.00 | | |
| 3b | B | 53.65 | 24.95 | | | 100.00 | 75.00 | 73.73 | 36.50 |
| 4a | A | 53.65 | 24.95 | 26.33 | 13.03 | 100.00 | 75.00 | | |
| 4b | B | 53.65 | 24.95 | | | 100.00 | 75.00 | 26.33 | 13.03 |

TABLE 7

| Sample | Method | NVV | TCR | PVC | Filterable solids | % Solids as Grit |
|---|---|---|---|---|---|---|
| 1a | A | 37 | 32 | 25.00 | 0.12 | 0.09 |
| 1b | B | 37 | 32 | 25.00 | 0.53 | 0.39 |
| 2a | A | 37 | 32 | 30.00 | 0.28 | 0.23 |
| 2b | B | 37 | 32 | 30.00 | 2.37 | 1.93 |
| 3a | A | 37 | 45 | 25.00 | 0.53 | 0.39 |
| 3b | B | 37 | 45 | 25.00 | 39.37 | 28.85 |
| 4a | A | 37 | 45 | 35.00 | 50.53 | 44.72 |
| 4b | B | 37 | 45 | 35.00 | 59.50 | 52.66 |

The results in Table 7 and FIG. 3 show significant storage stability improvement, manifested by significant grit reduction is during storage, for composite particle dispersions prepared according to Method A rather than according to Method B (the method recommended by the first polymer supplier).

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A pigment grind dispersion comprising non-adsorbed titanium dioxide particles dispersed in an aqueous emulsion containing a mixture of:
   (a) water-insoluble film-forming first polymer particles that adsorb to titanium dioxide particles, the first polymer particle amount in the emulsion being less than the saturation level of adsorption when another polymer is not present,
   (b) water-insoluble film-forming second polymer particles that do not by themselves form composite particles with titanium dioxide particles, the second polymer particle amount in the emulsion being sufficient to inhibit or interfere with adsorption of the first polymer particles to titanium dioxide particles, and
   (c) extender particles,
wherein the pigment grind dispersion has a titanium dioxide pigment volume concentration of about 25 to about 50 and a titania composite ratio of about 32 to about 60.

2. A pigment grind dispersion according to claim 1, further comprising a dispersing agent.

3. A pigment grind dispersion according to claim 2, wherein the dispersion is circulating.

4. A pigment grind dispersion according to claim 3, further comprising a defoamer.

5. A pigment grind dispersion according to claim 1, having a titanium dioxide pigment volume concentration of about 30 to about 50.

6. A pigment grind dispersion according to claim 1, having a titania composite ratio of about 32 to about 50.

7. A pigment grind dispersion according to claim 1, containing about 27 to about 37 weight percent titanium dioxide particles, about 18 to about 49 weight percent first polymer particles, and about 55 to about 14 weight percent second polymer particles, based on the dry weights of these particles compared to the total dry weight of ingredients in the pigment grind dispersion.

8. A pigment grind dispersion according to claim 7, containing up to about 100 weight percent extender particles based on the weight of titanium dioxide particles.

9. A pigment grind dispersion according to claim 1, wherein the first polymer particles include pendant phosphorus groups, acetoacetoxy groups, 1,3-dicarbonyl groups, aldehyde groups, acid groups, amine groups, epoxy groups, isocyanate groups, thiorane groups, isothiocyanate groups, alcohol groups, carbodiimide groups, aziridine groups, haloalkane groups, or halophenyl groups.

10. A pigment grind dispersion according to claim 1, wherein the first polymer particles include pendant phosphorus groups.

11. A pigment grind dispersion according to claim 10, wherein the phosphorus groups include acid groups.

12. A pigment grind dispersion according to claim 10, wherein the phosphorus groups include dihydrogen phosphate groups.

13. A pigment grind dispersion according to claim 1, wherein the first polymer particles are multistage polymers.

14. A pigment grind dispersion according to claim 1, wherein the first polymer particles are free of voids.

15. A pigment grind dispersion according to claim 1, wherein the second polymer particles comprise acrylic, ethylene vinyl acetate, polybutadiene, polyvinylidene, styrene acrylic, vinyl acrylic or vinyl acetate-vinyl versatate particles, or a mixture thereof.

16. A pigment grind dispersion according to claim 1, wherein the second polymer particles are acrylic latex particles.

17. A coating composition comprising a pigment grind dispersion according to claim 1, and additional water-insoluble film-forming emulsion polymer particles that do not adsorb to the titanium dioxide particles.

18. A coating composition according to claim 17, further comprising one or more pigments other than titanium dioxide.

19. A coating composition according to claim 17, further comprising one or more coalescents, cosolvents or plasticizers.

20. A coating composition according to claim 17, further comprising one or more rheology modifiers.

* * * * *